United States Patent [19]

Aparicio, IV et al.

[11] Patent Number: 5,357,597
[45] Date of Patent: Oct. 18, 1994

[54] CONVOLUTIONAL EXPERT NEURAL SYSTEM (CONEXNS)

[75] Inventors: Manuel Aparicio, IV, Arlington; Samuel E. Otto, Grapevine, both of Tex.

[73] Assignee: International Business Machines Corporation, Armonk, N.Y.

[21] Appl. No.: 720,278

[22] Filed: Jun. 24, 1991

[51] Int. Cl.$^5$ .......................................... G06F 15/18
[52] U.S. Cl. ...................... 395/21; 395/24; 395/27; 395/23
[58] Field of Search ................. 395/23, 24, 25, 27

[56] References Cited

U.S. PATENT DOCUMENTS

| | | | |
|---|---|---|---|
| 4,254,474 | 3/1981 | Cooper et al. | 364/900 |
| 4,326,259 | 4/1982 | Cooper et al. | 364/715 |
| 4,760,604 | 7/1988 | Cooper et al. | 382/75 |
| 4,897,814 | 1/1990 | Clark | 365/49 |
| 4,943,931 | 7/1990 | Allen | 365/513 |
| 4,972,363 | 11/1990 | Nguyen et al. | 364/807 |
| 5,033,006 | 7/1991 | Ishizuka et al. | 364/513 |
| 5,113,367 | 5/1992 | Marrian et al. | 364/819 |
| 5,148,385 | 9/1992 | Frazier | 364/728.07 |
| 5,265,224 | 11/1993 | Maruno | 395/24 |

OTHER PUBLICATIONS

Lippmann, R. P., "An Introduction to Computing With Neural Nets", IEEE ASSP Mag., Apr. 1987, pp. 4–22.
McClelland et al., Explorations in Parallel Distributed Processing, Mit Press, 1988, pp. 83–108.
Hirose, et al., "Back-Propagation Algorithm Which Varies the Number of Hidden Units," Neural Networks, vol. 4(1), 1991, 61–66.
Manoel Tenorio, "Topology Synthesis Networks", 1990, pp. 363–380, Parallel Computing.
Wei K. Tsai, ASDM, A Novel Network Model, UC Irvine, pp. 171–176, IJCNN, 1990.
Stephan Jockusch, A Neural Network Which Adapts, 1990, pp. 169–172, Parallel Processing in Neural Systems and Computers.
Kulkarni, A. D., "Self Organizing Neural Networks with a Split/Merge Algorithm", 1990, pp. 255–261, ACM SIGSMALL/PC.
Golea, M., "A Growth Algorithm for Neural Network Decision Trees", Europhysics Letters, 1990, pp. 205–210.
Fahner G., "A Higher Order Unit That Performs Arbitrary Boolean Functions", pp. 193–197, IJCNN, 1990.
Barnden, John, Dissolving Variables in Connectionist Combinatory Logic, Jan. 31, 1990, pp. 709–714.
Milligan, Derek, "Requirements for the Synthesis of Boolean Neural Networks", pp. 567–572, IJCNN, 1990.
Deffuant, Guillaume, Neural Units Recruitment Algorithm for Generation of Decision Trees, pp. 637–642, IJCNN, 1990.
Martin, R., "Single-Interval Learning by Simile within a Simulated Hebbian Neural Network", pp. 213–225, Computers Math Applic., 1990.
Stinchcombe, Maxwell, "Universal Approximation Using Feedforward Networks with Non-Sigmoid Hidden Layers", pp. 613–617, IJCNN, 1989.
Tattersall, G. D., "Optimal Rule Induction in Neural Networks", INNC, 1990, p. 788.
Milotti, Edwardo, "Parity and the Shapes of Neuron Transfer Functions in Feedforward Neural Networks," Intl. J. of Neural Systems, 1990, 247–248.
Sutherland, John, "A Holographic Model of Memory, Learning and Expression", 1990, pp. 259–267, Intl. J. of Neural Systems.
Loos, Hendricus, Parity Madeline, Laguna Research Lab, pp. 111–118, IJCNN, 1990.

Primary Examiner—Robert W. Downs
Attorney, Agent, or Firm—Whitham, Curtis, Whitham & McGinn

[57] ABSTRACT

Based on the recognition that transfer functions of Boolean completeness can be expressed as a domain within a periodic function, an architecture of a artificial neuron which is fully generalized in application and capable of rapid learning with minimal memory requirements while maintaining content addressability of memory, is provided. Full functionality of this architecture is demonstrated for an input vector containing two values. Extension to three variables shows the potential for generality of this architecture to N-valued input vectors.

6 Claims, 10 Drawing Sheets

CONVOLUTIONAL EXPERT NEURAL SYSTEM (CONEXNS)

BACKGROUND OF THE INVENTION

1. Field of the Invention

The present invention generally relates to artificial intelligence and adaptive systems and, more particularly, to a neural system of generalized applicability and enhanced adaptive capability.

2. Description of the Prior Art

It has long been recognized that a major limitation of computing or data processing systems is the need for detailed programming and data entry. Many problems of great complexity exist which might be susceptible of solution with computers but for possibly incomplete knowledge of the problem or an inherent inability to characterize the problem which precludes sufficiently detailed programming for satisfactory solution of the problem. Therefore there has been a great interest in artificial intelligence and adaptive systems which can analyze conditions or other inputs in order to study the problem and adaptively seek a solution.

As an example of a problem which is inherently difficult to characterize, artificial intelligence could be used to greatly enhance the human-computer interface by allowing the computer to observe the habits of the user and optimize its own performance by operating predictively to manage the retrieval of subroutines which are likely to be needed. This has been done, to a degree, in arrangements for managing cache memories in regard to the operation of known application programs. However, given the variety of habits or ways in which different users may interact with particular application programs (e.g. if the user typically prints a document after completing a particular number of pages thereof, a spooler routine could be predictively fetched), it can be readily understood that a highly adaptive artificial intelligence arrangement would be required.

Accordingly, much effort has been expended in study of the learning process in humans and animals in an effort to simulate such processes by computer. In theory, accurate simulation would provide an artificial intelligence system of greatest generalization (e.g. applicability) and which would have the capability of inference and extrapolation as well as optimally fast learning or adaptation.

At the present state of the art, artificial intelligence systems are of massively parallel architecture. The basic element of such systems is the so-called neural circuit which must minimally have inputs for information, storage for such information, an arrangement to assign weights to respective portions of such information, a means for mapping the combination of inputs to an output based on the assigned weights and some means for altering the weights in response to a comparison of the output produced and the desired output. It is the ability to alter the assigned weight values and correspondingly alter the output of the neuron that allows the neuron to "learn".

The highly parallel architecture of artificial intelligence systems implies that any practical system must include extremely large numbers of neural circuits. Therefore, the complexity of each neural circuit must be kept to a manageable level which will allow great numbers of neural circuits to be combined into an artificial intelligence system. Particularly within this constraint, it has not been possible to provide optimal adaptability of the map and thus provide a neural circuit of generalized applicability.

Consider a digital input of N bits, each bit representing a piece of information or a stimulus. If the neuron is to be fully generalized, some bits of the input may be crucial to determining the output, some may be conditionally important (e.g. in combination with certain states of other bits) and some may be entirely irrelevant to the output. It must be remembered in this regard that the intended function of the neural circuit is to adapt itself to respond to certain combinations of the input bits with certain desired responses and thus develop the ability to map certain input combinations to desired outputs. The neural circuit will not initially know anything about the nature of the response it is to make to any bit or combination of bits of the input and must learn to provide the desired mapping of inputs to an output by developing weights which are to be applied to the values of the inputs. It can readily be appreciated that such a circuit can learn that certain inputs are crucial or irrelevant (developing a one or zero weight, respectively), but the learning of the weights to derive the desired response to a combination of inputs may prove difficult or require an excessive amount of time. For example, it was long believed that an Exclusive-OR transfer function could not be learned. At the present state of the art, circuits of greater complexity have been able to learn the Exclusive-OR function but the learning process is slow in terms of the number of iterations which may be required.

It can be shown that the number of Boolean functions which the neural circuit should ideally be able to emulate for N binary inputs is 2 exp ($2^N$). Therefore, for only two binary inputs, the number of transfer functions would be 16. For three binary inputs, the number of transfer functions would be 256. Four inputs would require over 64,000 transfer functions, and so on. Even the accommodation of a small number of Boolean functions has proven difficult in the past. Therefore, the development of a realistic neuron (e.g. a neural circuit capable of complete Boolean response), while possible, is very difficult, particularly in view of the difficulty of producing learning of the Exclusive-OR function.

It is typical in neurons to provide a storage means for weights which are to be applied to the inputs. This storage is typically provided by a counter which is incremented or decremented until the desired function is unconditionally achieved, if it can be achieved at all. The criterion for incrementing or decrementing a counter for learning in this manner is referred to as the Hebbian Rule which generally provides, for example, that the weight of an "on" input is incremented and the weight of an "off" input is decremented when an actual output of the neuron is produced which is less than the desired output and vice-versa. Once the desired actual output is reached, it is assumed that learning is complete. However, since learning is usually implemented by performing small incremental weight changes requiring multiple passes through the data set, such a function does not provide true adaptability where learning can continue as conditions of desired output change. Since learning is accomplished by processing (such as by back-propagation) through all stored data, each learning event necessarily takes longer than the last until the learning performance of the circuit becomes unacceptably slow, particularly for neural circuits where N is large.

In contrast to so-called learning architectures such as the above-noted back-propagation architecture, rapid storage is possible in so-called memory based neural circuits such as the Hopfield circuit, schematically illustrated in FIG. 1a. As will be described in greater detail below, these types of circuits allow many input vectors to be readily memorized and principally recognize differences, if any, between a given input vector and a vector previously input and stored.

Ideally, in either type of neural circuit, all input data which has contributed to learning should be retained in memory and learning should be continuous but nevertheless provide a rapid response to alteration of desired output for any given input vector or a desirably rapid learning curve. However, it can be readily understood that such a provision would require either extremely large memory or extended processing time or both as the number of stored items is increased. For instance, with known back-propagation processes, it is necessary to add new data to a file of historical data and to then process the entire file to determine the new response of the neural circuit. This, itself, can be a severe limitation on speed of learning response.

The memory based architectures attempt to hold extremely large address spaces by using statistical techniques. However, they are then incapable of perfect memory of learning events. Therefore, it can be seen that the attempt to provide a simulation of an ideal or biological neuron has appeared to be replete with insoluble difficulties or problems which could not be approached due to inherent practical hardware limitations.

Due to such inherent practical hardware limitations, it has been the practice in the art to resort to statistical representations of the data acquired during the learning process. However, once this has been done to bring memory requirements within practical limits, there is no way to thereafter determine which vectors, presented to the system, produce results by generalization from the statistical representation of the data or from actual previous input vectors, inherently creating an inability to determine confidence levels in the sense of determining whether exact precedent exists for any particular decision.

Additionally, it should be noted that the back-propagation type of circuit is of static configuration and can only be optimized for economy of hardware and learning performance with foreknowledge of the nature of the learning it is to do. Therefore, this approach, at the present state of the art, appears to be particularly ill-suited to being generalized sufficiently to accommodate learning where nothing is known of the problem beforehand. On the other hand, while the Hopfield type of neural circuit may be theoretically capable of rapid response, its generalization requires impractical amounts of memory due to inefficient and storage as will be discussed in greater detail below. If statistical representations are used to reduce memory requirements, the Hopfield type of neural circuit would be inherently incapable of being able to distinguish actual input vectors which have been memorized from the statistical representations thereof.

In summary, approaches to the design of neuron-simulating architectures has led toward either memory-based architectures or learning architectures. Memory-based architectures, such as the so-called "Hopfield network", shown in a simplified form in FIG. 1a, has a theoretical maximum efficiency of storing 2N vectors for N inputs. However, this theoretical efficiency can be approached only with particular input vectors and connections and in practice, maximum efficiency is only about 15% (e.g. requiring 100 neural circuits to represent 15 vectors of 100 bits, each). Such memory-based architectures provide for a content addressable memory and generally provide a very fast storage response to new input vectors, but are not efficient in use of hardware. Learning architectures, on the other hand, as shown in simplified form in FIG. 2a, use incremental adjustments in weights to modify an otherwise fixed transfer function. Learning architectures provide a more effective and statistically reliable basis for inferential decisions and require less memory but are inherently slow because of the incremental nature of the development of weights by which the transfer function is modified.

SUMMARY OF THE INVENTION

It is therefore an object of the present invention to provide an emulation of a biological neuron which is physically realizable in electronic circuitry.

It is another object of the invention to provide a compressed representation of stored vectors in Boolean space characterizing the response of a neuron to an arbitrary input vector.

It is a further object of the invention to provide a learning mechanism which immediately incorporates a newly received input vector into memory without disturbing the storage or accessibility of previously stored input vectors which have contributed to the learning process of a physically realizable artificial neuron.

It is yet another object of the present invention to provide for immediate utilization of a new input vector or an altered desired response in a physically realizable artificial neuron.

It is another further object of the invention to provide the capacity of inference and determination of confidence levels (e.g. "fuzzy logic", including definite recall of whether a specific vector is in memory or not) in a physically realizable artificial neuron.

In order to achieve the above and other objects of the invention, a method of adaptively altering the activation function of an artificial neuron is provided including the steps of storing in a memory a number of weighting values equal to the number of values included in an input vector and a wave value corresponding to at least one of the slope and the period of a wave function representing at least one transfer function, computing at least one periodic wave function from the period and the weighting values, including computing phase and amplitude values of said periodic wave function from the weighting values, deriving at least one value from the periodic wave function corresponding to a value included in an input vector, and adding all the values derived from the periodic functions.

In accordance with another aspect of the invention, a method is provided for altering the state of an artificial neuron including the step of determining whether a current input vector has been written to memory on the basis of a threshold value.

In accordance with a further aspect of the invention, an artificial neuron is provided including means for storing in a memory a number of weighting values equal to the number of values included in an input vector and a wave value corresponding to at least one of the slope and the period of a wave function representing at least one transfer function, means for computing at least one periodic wave function from the period and the weighting values, including computing phase and amplitude values of said periodic wave function from said weighting values, means for deriving at least one value from the periodic wave function corresponding to a value included in an input vector, and means for adding all the values derived from said periodic functions.

In accordance with a further aspect of the invention, an architecture for an artificial neuron is provided having a counter for counting the number of input vectors stored in a memory of the artificial neuron, at least one compartment means for storing data representing a response to an input vector or a means for comparing a summation of outputs from compartment means and a threshold based on a count of storage operations to produce an output.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
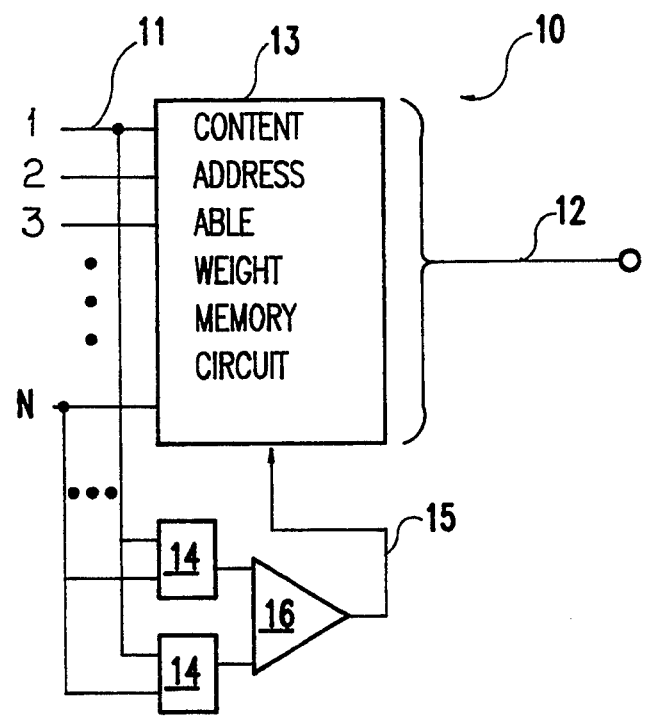
FIG. 1a is a schematic diagram of a simplified form of a memory based architecture for a neural circuit.

Referring now to the drawings, and more particularly to FIG. 1, there is shown a simplified schematic diagram of a memory based neural circuit 10. This circuit includes an arbitrary number of inputs 11 to a content addressable memory and circuit 13, which develops a plurality of outputs 12 by asynchronously comparing the combinations of input values, taken two at a time (for any arbitrary number, N, of inputs) with the weights stored for each combination. By resolving conflicts between the input vector values and the weights representing previous memory entries, an output is developed for the plurality of outputs 12. Thus, the output will be either the input or a modified version of the input which is most closely resembled by a previous input. The inputs are compared, pair-wise, with each of the other inputs by schematically illustrated commutators 14 and comparator means 16 and the weights in memory 13 are updated based on the Hebbian Rule under the control of the output 15 of comparator 16 such that the weight for a given pair is incremented when the inputs are both of the same state and decremented when their states differ.

Figure 1B:
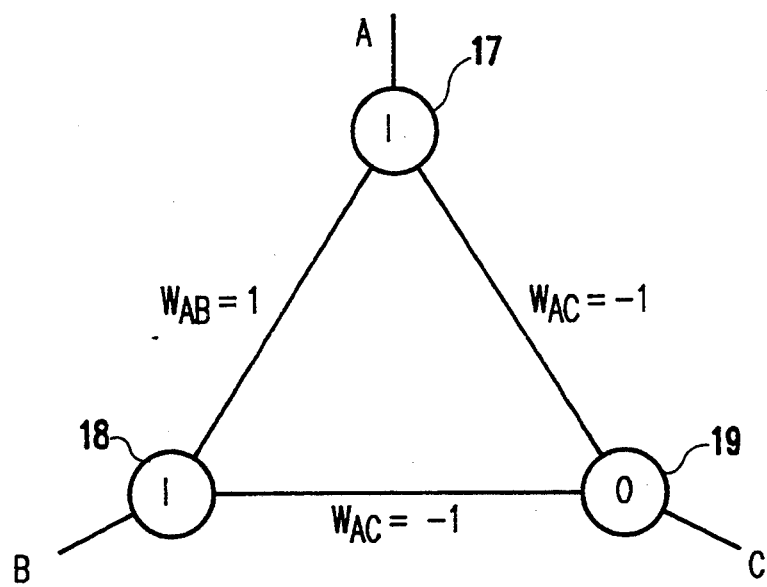
FIG. 1b is a diagram useful is explaining the operation and characteristics of the neural circuit of FIG. 1a, FIG. 2a is a schematic diagram of a simplified form of a learning architecture for a neural circuit.

In operation, the arrangement of FIG. 1a is illustrated in FIG. 1b. For an input vector, $I(A,B,C)=(1,1,0)$, as shown at elements 17, 18 and 19, which are usually formed by registers, certain relationships exist between the input vector values, taken in pairs. Specifically, they will be either equal or unequal. Assigning a weight of 1 when a pair of values are equal and a weight of $-1$ when a pair of values are unequal it can be seen that N weights can represent all pairs of input values.

Assuming now that the weights shown for $W_{AB}$, $W_{BC}$ and $W_{AC}$ are stored, and vector $I(A,B,C)=(1,1,1)$ was applied to the inputs, the sum of the products of input values and weights would be most negative at 19 and the a vector of (1,1,0) would be output since the alteration of C from 1 to 0 would be the closest match to a memorized input vector. While this process would be performed iteratively, it can easily be seen that if $W_{AB}=1$, registers 17 and 18 must both be 1 or both 0 which would involve the change of a greater number of input values that the single value of C to satisfy the input values as reflected by the stored weights.

While it may be noted that an input vector which is complementary (e.g. (0,0,1)) to the stored vector also satisfies the stored weights, it is then impossible to distinguish between them and to know which was, in fact, written and which is spurious. This ambiguity is characteristic of the Hopfield type of neural circuit and cannot be remedied. It is also a contributing factor to the inefficient use of memory by such memory based architectures. Therefore, a different representation of learning events is necessary to overcome this deficiency of Hopfield type neural circuits.

Also, although relatively trivial, it should be recognized that a sigmoidal transfer function exists in the arrangement of FIG. 1a which is a step function changing from $-1$ to $+1$ at 0 (representing the transition of the input vector value pairs from equal to unequal).

Incidentally, it is to be understood that various values, whether binary or otherwise, are used herein in a symbolic sense and no inference or limitation as to the form of such values within any particular embodiment, form or construction of the invention, whether realized or simulated, is intended. For instance, it is immaterial to the practice of the invention whether a binary or bipolar number is represented in a form where specific voltages correspond to different digit values or whether binary or other codes are used to represent the signs of numerical values or terms such as "on" and "off".

Figure 2A:
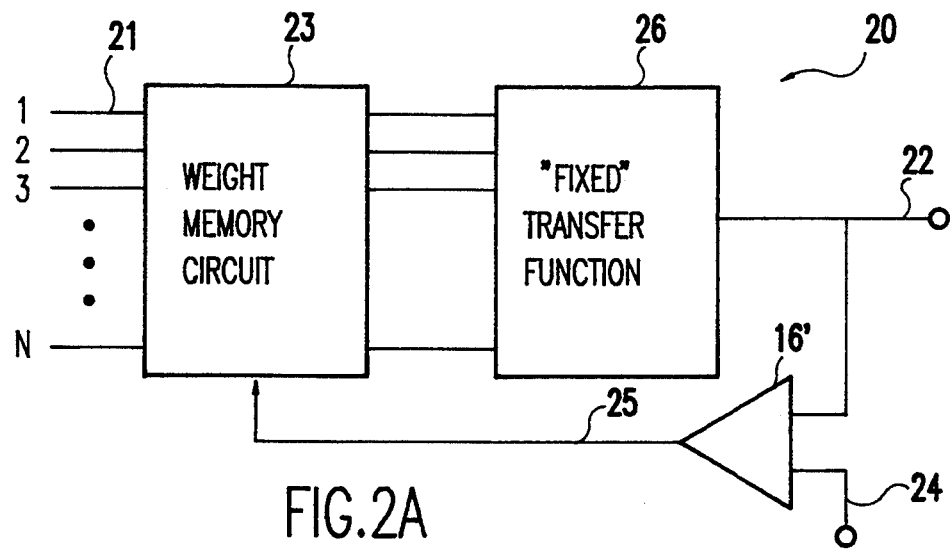
FIG. 2b is a diagram useful is explaining the operation and characteristics of two versions of the neural circuit of FIG. 2a, FIG. 2c is a diagram representing an extension of the learning architecture of FIGS. 2a and 2b.

The learning architecture shown in FIG. 2a similarly includes a plurality of inputs 21, a weight memory and circuit 23 for applying stored weights to the values of the input vector. The weighted values are then applied to a "fixed" transfer function element 26 which is typically in the form of a summer and a threshold circuit to yield a sigmoidal or sometimes Gaussian transfer or activation function. By testing the sum of the weighted inputs against a threshold value, a decision is made concerning the output state (e.g. whether each value of a previously memorized vector produced an increment or decrement in the weight in accordance with the Hebbian Rule) of output 22. A comparison of output 22 with desired output 24 is made by comparator 16' and control of the memory supplied over line 25.

Figure 2B:
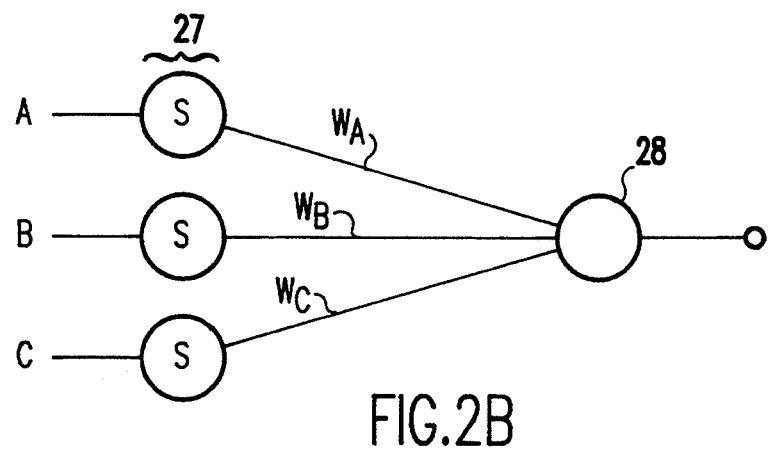

If the arrangement of FIG. 2a is implemented as shown in FIG. 2b, known in the art as a Perceptron, it can be readily understood that the transfer function provided by adder or summer 28 can only be modified to the extent of establishing ones of the values stored in registers (e.g. sensory units) as either crucial or irrelevant to the decision. This type of circuit cannot learn transfer functions which involve interaction of terms, such as the Exclusive-OR function. This is a sever limitation particularly in view of the fact that iterative incrementing and decrementing of weights causes the circuit to be inherently slow. Errors occasioned by being Boolean incomplete (e.g. a series of inputs to be stored and which reflected interaction between variables would cause oscillation between responses, of which, none would be correct) might be detected manually at termination of the learning process but the time spent in seeking to have the circuit learn that which it was inherently incapable of unambiguously recognizing might not become apparent until after the expenditure of substantial processing time.

Figure 2C:
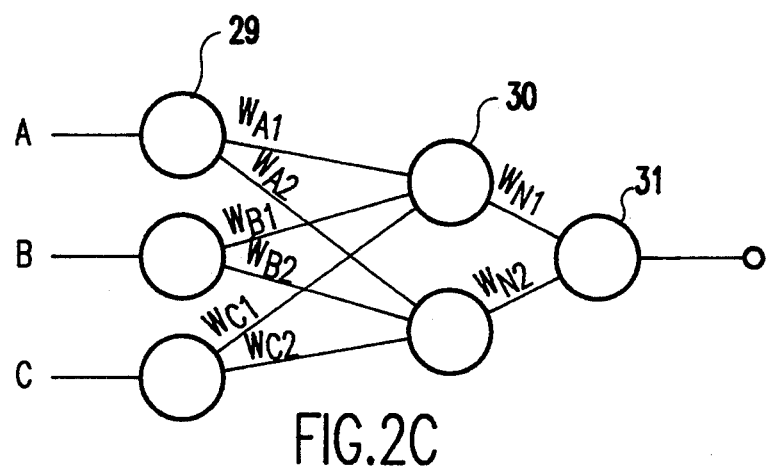

A known circuit which can learn a transfer function which involves interaction between input vector values is shown in FIG. 2c. In comparison to FIG. 2b, the sensory units 29 and adder 31 are identical to sensory units 27 and adder 28 (often referred to as a motor neuron), respectively. However, the arrangement of FIG. 2c also contains hidden units 30, also having possibly sigmoidal transfer or activation functions. Weights are applied to each possible interconnection between one of the elements 29 and each of the elements 30. At the present state of the art, the necessary number of elements 30, as a function of input vector values N and the number of these values which may be interactive, is not well-understood. While it is known that having a few too many will produce correct results and having too few will not, having more than is necessary represents a major storage and computational burden on such an arrangement. Both extremes of numbers of hidden units degrade performance and the optimum number, and, hence, optimum performance can only be determined by trial-and-error. Therefore, while this circuit may be generally regarded as potentially Boolean complete, storage requirements are large, even if optimum (but recognizing that there is presently no known way of optimizing the number of elements 30) and the learning of a transfer function involving interaction of variables may require thousands of iterations even when N is relatively small because of the additional number of weights which must be incrementally adjusted.

Figure 3:
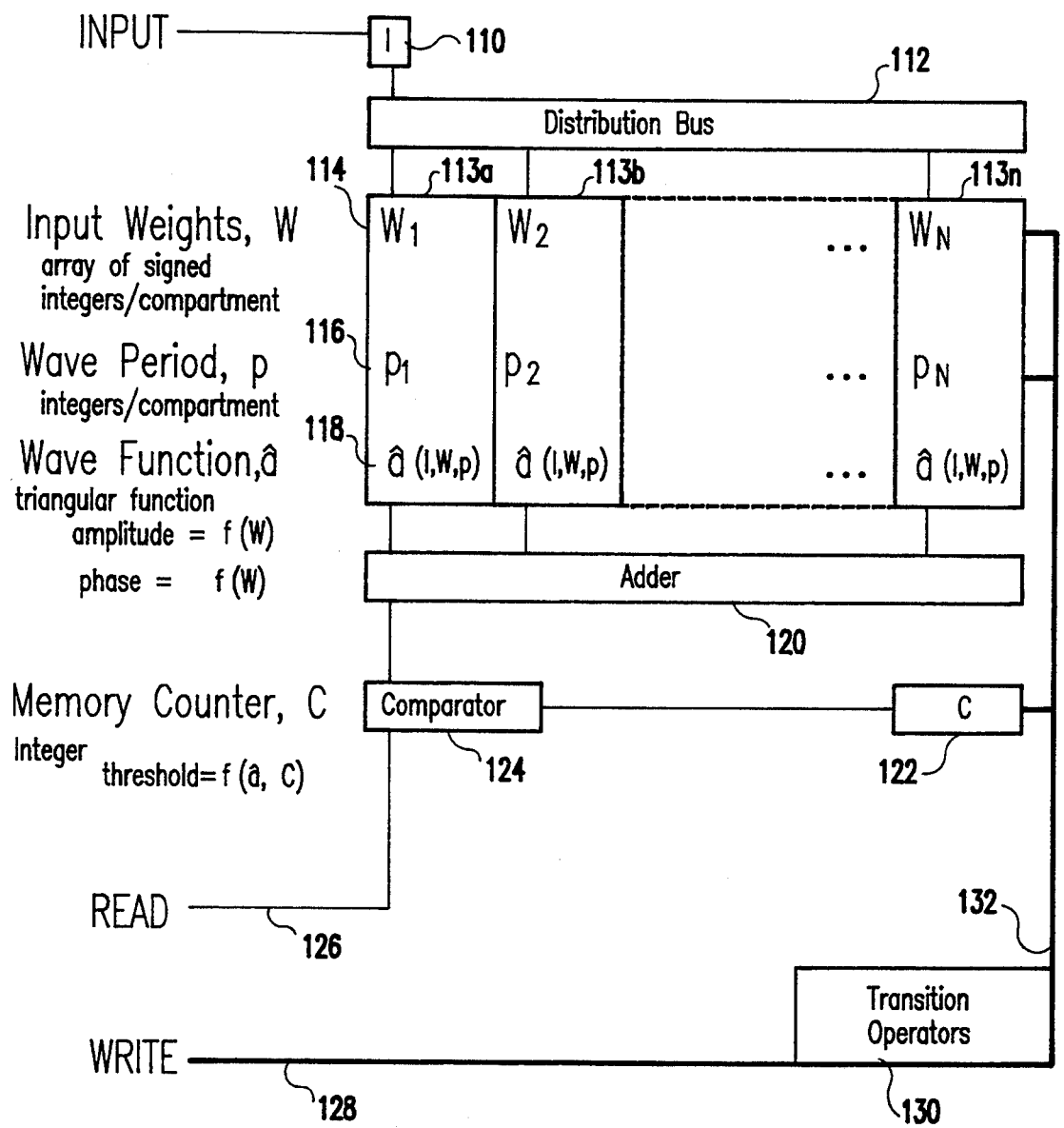
FIG. 3 is a diagram of the architecture of an artificial neuron in accordance with the present invention.

With the above as background, the invention will now be explained beginning with FIG. 3. In FIG. 3, the novel neuron architecture 100 of the present invention is schematically shown. While some aspects of this architecture may seem to be superficially similar to the architecture of FIG. 2a, such is not the case. While the input 110 and distribution bus 112 are, in fact, the same as in the prior art neural circuit of FIG. 2a, this novel architecture is principally characterized by a number of compartments 113a–113n which together produce the ability to treat stored values as lying within a domain of one or more periodic functions. In a manner similar to a Fourier transform, which may be used to transform a particular function into a series of periodic functions and vice-versa, the convolutional process, according to the invention, transforms input vector values into a periodic function which, with convolution, is folded back to obtain coefficients, or weighted values of the inputs for evaluation and possible storage. In this way, input vectors which might contribute to learning are effectively folded back from the periodic function to fall within a single domain thereof to avoid storage of seemingly different vectors which are, in fact, equivalent, within the Fourier domain. By doing so, the order of learning is made largely irrelevant and the network proceeds rapidly from Boolean state to Boolean state by transforming one periodic function set to another. This is done without decompression of the stored vector data, but, like Fourier compression, storage requirements are minimized.

Certain values associated with input vectors which will be explained in more detail below are stored for each compartment 113a–113n and certain values will be stored for the array of compartments or preferably so. Specifically, weights 114 for each of N input values in an input vector will be stored, preferably as a matrix with one row holding the N input values and a column for each compartment in use. (In this regard, it is important to note that not all compartments need be in use at any time during learning or even when the learning process is complete although potentially N compartments could possibly be required.) Further, each compartment will store a single wave period 116 (or slope, which is a substantially equivalent term in the context of the present invention, and computationally preferable since it is defined, for a triangular wave, as the slope for any one of its segments). Additionally, for all compartments, a count will be maintained in register 122 of the number of times the memory has been updated in the course of learning. Therefore, it is seen that, according to this novel architecture, storage for a maximum of only $N(N+1)+1$ values must be provided and, operationally, when a plurality of such neurons are in use, the average number of storage spaces required will be far fewer. The required capacity is defined not by N but by the combination of N and the interactive complexity of the environment (e.g. problem space). The present invention thus dynamically determines and establishes the optimum internal structure for any given number of vectors and interactive complexity of those vectors, in contrast to back-propagation architectures which are necessarily of static configuration as to which no optimization methodology is known.

Additionally, associated with each compartment will be an arrangement for computing the summation of weighted input values (e.g. a summation of the product of an input value and a weight) and an arrangement for computing a wave function to determine an output value. This could be a single processor for serially making these computations for a plurality of compartments of a neuron or a plurality of neurons but, preferably, a single dedicated processor of application specific design will be provided for each compartment of each neuron for optimum performance.

Adder 120 of FIG. 3 differs from that of the prior art since the adders or summers such as 28 and 31 are essentially analog mixers and expect to see a weighted input from each hidden unit 29 or sensor unit 27 even if zero due to a weight of zero. In contrast, the adder 120, according to the invention, only adds the values which are delivered from compartments in use and a mixing function is inappropriate. This need not infer greater complexity since simple digital adders may be used.

Comparator 124 also has no counterpart in the prior art since its function is to compare the output of adder 120 with the count from counter 122 in order to determine whether or not the input vector matches a vector already stored in order to exactly determine whether or not a vector is present in memory. The determination of whether or not to write to memory can be based on the output 126 of comparator 124. If the vector is in memory, it does not need to be written again. If it is not in memory, the write operation can be selectively controlled. By thus making the write operation selectively independent of desired responses, inferred responses can be written to memory of a neuron at will. Incidentally, if a vector does not produce an output of "1", the vector has not been written to memory and the neuron cannot, itself, thereafter determine whether or not such an output represents actual or inferred null responses, that information can be easily stored separately, possibly in another neuron operated in parallel for purposes of such a comparison. For example on neuron could be used to store cases where input vectors are to be mapped to "1" and another to store cases which are to be mapped to "0".

The transition operators, schematically depicted at 130 of FIG. 3 control incrementing of the counter 22 when a write is performed, apply the Hebbian rule to inputs and existing weights to derive the new weights to be written or overwritten in a particular compartment and control the generation and destruction of new compartments, defining their new weights and period.

Figure 4A:
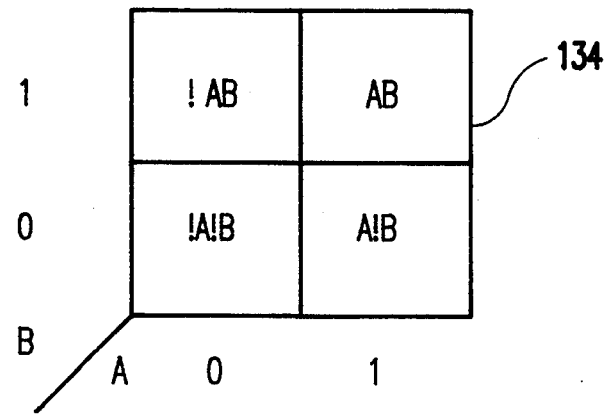
FIG. 4a is a diagram useful for explaining the notation specifying input state combinations, particularly in FIG. 4b.
Figure 4B:
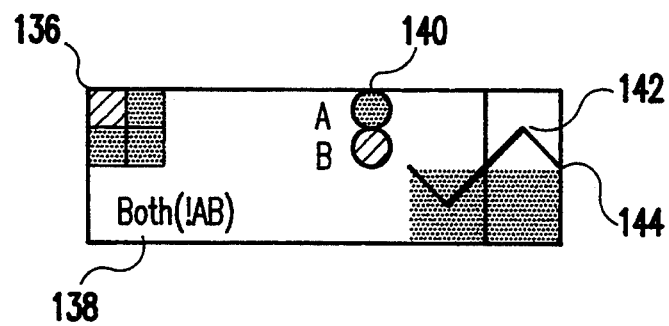
FIG. 4b is a diagram for explaining the operation and function of the architecture of FIG. 3, according to the invention.

An explanation of the function of the invention in accordance with the architecture of FIG. 3 may be more clear from a notation devised for such purpose as illustrated in FIGS. 4a and 4b. FIG. 4a introduces a standardized arrangement of possible input cases that will be used for graphically illustrating the memory contents and associated Boolean function of a neuron with 2 binary inputs, A and B, ranging from no cases in memory (Never) to all cases being in memory (Always). Feature 134 shows the 4 possible cases from A and B both off, !A!B, to both being on, AB. FIG. 4b shows the graphic representation that will be used to describe these states. Feature 136 is a representation of the state space as described in feature 134. Feature 136, in this particular case, shows the !AB cases to be on (e.g. stored), with the rest off (e.g. not stored). Feature 138 shows the set expression of the Boolean function this represents: in this case the AND operator, described as the set operator, Both (!A,B). The rest of FIG. 2b shows the neural representation of the weights and periodic transfer function. Feature 140 shows the connection weights for A, which is $-1$, and B, which is $+1$; in general, the shading indicates the sign of the weight, and size indicates magnitude of the weight. Feature 142 shows the wave function (e.g. activation function), in this case, period, $\lambda=4$, phase, $p=1$, and amplitude, $\alpha=2$. The thicker portion of the function's graph indicates its domain; in feature 142, the values of x-axis are limited between $-1$ and $+1$. Feature 144 shows the threshold, $\theta=-1$ (the shaded area being at or below the current threshold).

Figure 5:
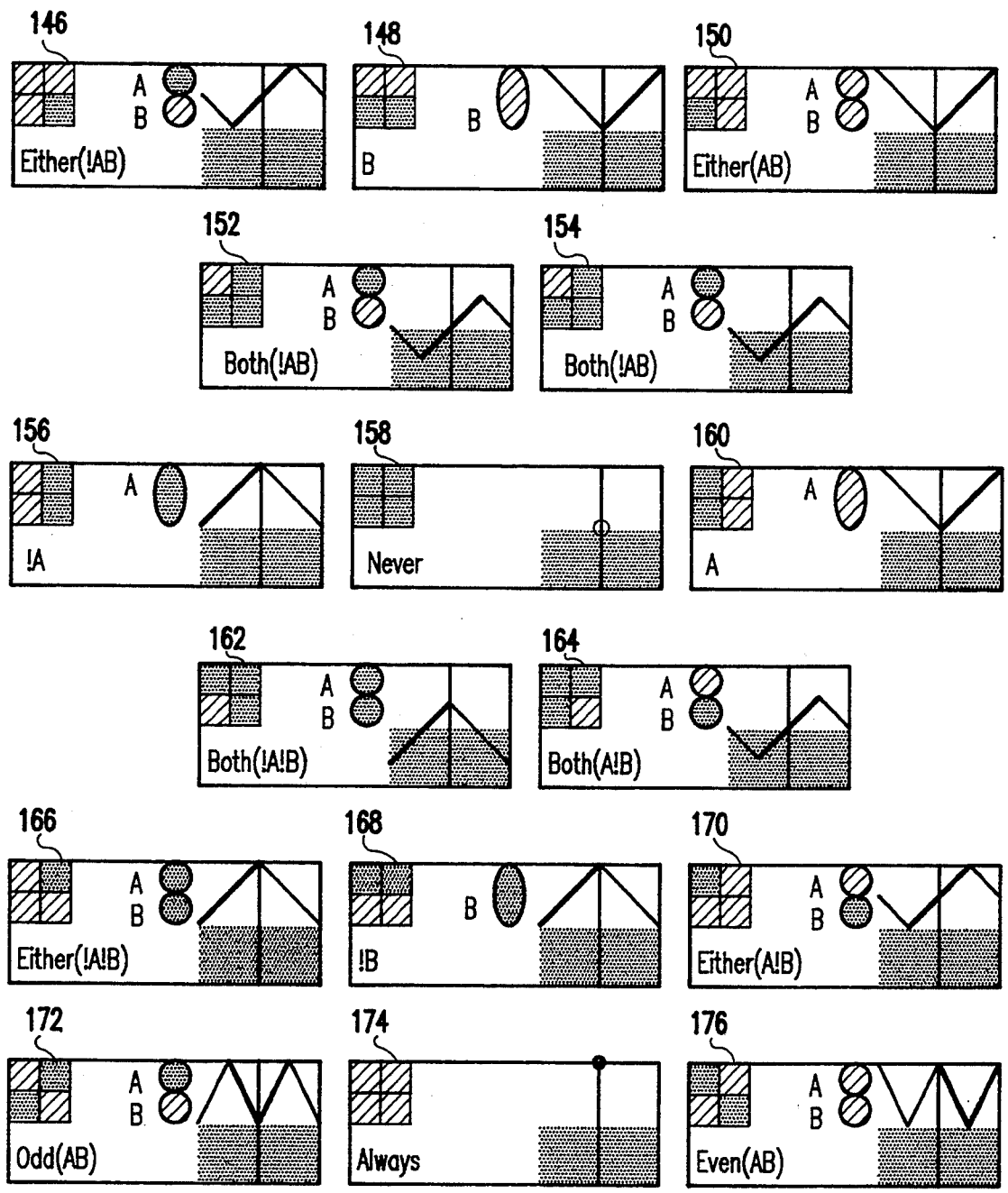
FIG. 5 illustrates the Boolean completeness of the present invention for two inputs in terms of the notation of FIG. 4b.

Referring now to FIG. 5, the neutral components indicate the completeness of the representation. For instance, features 152, 154, 162, and 164 represent the four possible AND functions. The only difference between them is the phase rotation, phase being defined by the sum of the positive weights. Features 146, 150, 166, and 170 represent the similar equivalence class for OR. The only difference between the AND and OR, features 154 and 150, for example, is the threshold, which is lower for OR. The OR function is described by the set operator Either (A,B).

It should be noted that these neural representations do more than compute Boolean functions; they demonstrate fuzzy logic and inference. Taking Either (A,B) as an example, the neuron's output is on given that either input variable is on. But if both input variables are on, the output is twice as strong as either one alone, indicating greater confidence in that AB is the "prototype" of the 3 cases in memory.

Aside from Never/Always, AND, and OR, two other equivalence classes complete the Boolean set of functions. Features 148, 156, 160, and 168 represent cases in which one variable is of no consequence. For instance in feature 148, A is of no consequence, and the Boolean function is simply "ifB". In these representations, the weight of one variable is 0 and the other is of absolute magnitude 2.

The remaining equivalence class includes the nonlinearities, XOR and XNOR, exclusive-OR and exclusive-NOR, which are labeled by their set operators Odd-(A,B) 172 and Even(A,B) 176, respectively. For instance, XNOR represents the identity function, being true if A and B have the same value. The neural weights represent this identity as well; both weights have the same sign. If fact, there are 2 valid weight sets for each of these functions. For XNOR, the weights must be both positive or both negative. For XOR, weights must be of opposite sign. This translates into 2 valid phases for the periodic function. In fact, features 172 and 176 show the double frequency of the periodic function that the 2 phases imply. The period of both these functions is 2, in contrast to 4 as in most the linear functions. Even though a periodic, nonlinear function is used for all transfer functions, some functions are termed "linear" in the sense that it is linear within its domain. All the functions for 2 variables, except XOR and XNOR are linear within their domain.

The differences in period relate FIG. 5 to FIG. 3 as follows: For 2 variables, j=2, so only 2 compartments are required, at most. The first one is for the linear or low frequency transfer functions, for example, the ANDs and the ORs, in which the period, $\lambda=4$. The second is for the nonlinear, higher frequency functions, namely XOR and XNOR, in which $\lambda=2$. FIG. 5 shows only one or the other of these transfer functions because only one is consequential, given only 2 variables. Although the compartments are reserved for different periods, the simplistic 2 variable problem only requires one period at a time for the definition of any single Boolean function.

Both waves are reserved in this preferred implementation but one or the other is always nil, defined as having all weights =0. For both compartments, all weights are initialized to 0 for the function Never, and the waves and threshold are then constructed according to the transition operators.

It should be noted in FIG. 5 that an additional notation feature is used in the expression of the limiting Boolean functions Always and Never. In these functions, the waveform collapses to a null waveform (because the weights are null, amplitude phase and period are also null) and is represented by a circle. It will also be appreciated that if the architecture of FIG. 3 is able to express this entire set of expressions, the invention not only provides Boolean-complete operation, but does so with a minimum of required storage while effectively maintaining storage of all inputs which result in memory of a content-addressable form, allowing the avoidance of long iterative sequences of incrementing and decrementing weights and thus maximizing learning speed.

Figure 6:
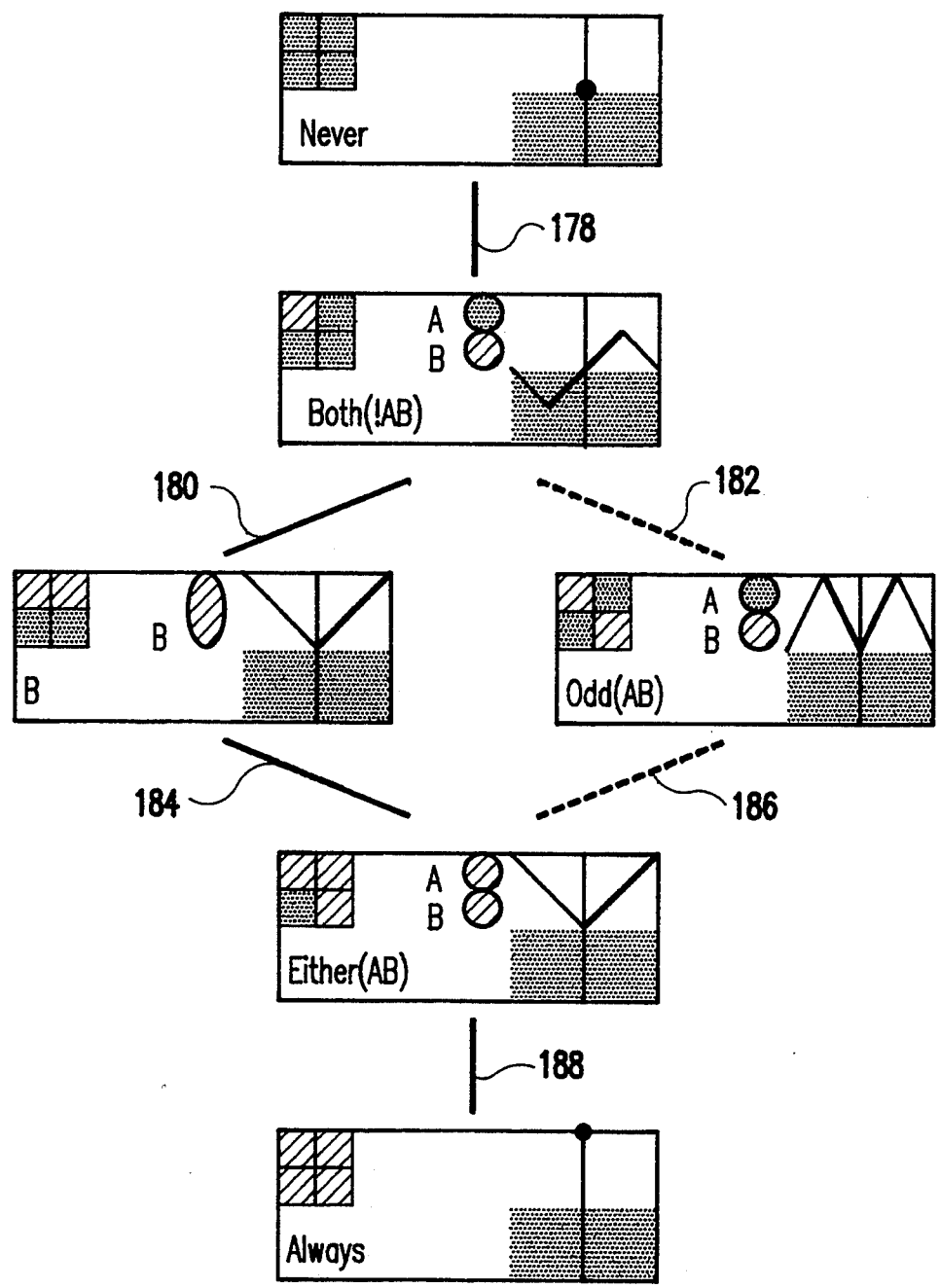
FIG. 6 illustrates an example of the transition operators.

This will now be empirically demonstrated with reference to FIG. 6. The uppermost notation of FIG. 6 indicates initialization conditions where all values of memory in the neuron are set to zero. At a time indicated by 178, assume an input of !AB is input. This condition is indicated by the upper left dark square of feature 136 and the shading of features 140, indicating these binary values of A and B. Since the stored weights are zero, the summation of the products of the inputs and the stored weights is also zero. The wave function is also zero since both the phase and amplitude are functions of the zero weights. However, if it is now determined to store this input vector, the weights stored will be determined by application of the Hebbian rule. The wave functions which will then be computed for a further input vector will correspond to the function shown: the new weight for A will be determined as weight $A=0-1=-1$ and the weight of B as weight $B=0+1=1$. From this new weight vector $(-1,1)$, the amplitude is given to be 2 and the phase is given to be 1. These values are derived from the activation wave function based on the values in the input vector. Specifically, a phase is computed as the summation of the positive inputs. The amplitude is found by summing the absolute value of the weights. The period is defined upon the formation of the compartment as discussed below. It follows that the first compartment will have a default value for period having a value of twice the amplitude (e.g. a slope of 1, indicating linearity or independence between the inputs). Then, the output of the compartment, "y", is found as a value along activation wave corresponding to an "x" value resulting from a summation of the products of the weights and input values.

Now note how any input vector can be read through the memory in this neuron. For the input vector just written, (0,1) if again input into the neuron, the sum of the inputs multiplied by their weights equals 1, which produces a value on the transfer function 1 higher than the threshold. Output=1. In contrast to the spurious memory of a Hopfield net, the input (1,0) is the compliment of what is in memory and in fact produces the value of the wave at its nadir, 1 below the threshold, indicating the largest Hamming distance possible for two inputs. The inputs (0,0) and (1,1) produce an output of 0, indicating a lesser Hamming distance.

This also demonstrates the neuron's fuzzy logic. In Boolean logic, all but (0,1) would be reported as simply "false". In this fuzzy logic neuron, the degree of falseness is also reported. This confidence measure is based on the Hamming distances of the Boolean space; (0,0) results in an output=0, indicating that a true state (output=1) is only 1 bit away; (1,0) on the other hand results in an output $=-1$, indicating that it is farther away. Given additional knowledge about the full scope of the wave's amplitude, it can also be seen that (1,0), is at the nadir of the wave, i.e. as far away from the written memory as is possible.

The count of memories written is also changed from 0 to 1 upon storage of the first input vector. This count is then used to calculate the threshold value that will separate this one written vector from all others. Because the count=1, the threshold should be lowered across the transfer function until only 1 point is readable above the threshold. Defining this point is a matter of the combinatories of the inputs. For instance, the apex can be reached only in one case, which is equivalent to both inputs taken 2 at a time because 2 taken 2 at a time equals 1). Threshold should therefore be set to $-1$, relative to this apex.

Assuming a further input vector (1,1) at time 180, and taking the left branch of FIG. 6, the process is repeated:
the output given (1,1) is 0, which implies that the change is linear from one linearly separable case to another,
the Hebbian rule applied to the given weights suffices, and
the counter is incremented.

Threshold must be recalculated from the new counter value, which is now $-2$ (e.g. 2 below the apex). It is noted that the apex of the wave is reached whenever B is on, and this is sufficient for the Boolean function. By the above-mentioned combinatorics, 1 taken 1 at a time equals 1 (the apex is still only a single point) but this point on the transfer function now represents 2 points in the Boolean space. In general, the number of points represented by any point on the wave is a function of how many of the other input vector values are irrelevant (their weights=0). Specifically, the capacity of any point equals 2 exp (number of zero weights). The apex must be above the threshold to represent the storage capacity of the wave or activation function, which is therefore lowered to the next readable point on the wave. This next lower point is at the nadir of the wave, given that the weight of $B=2$. Thus, the threshold is set to $-2$.

Assuming yet another input vector (1,0) at time 184, the same processes is repeated again because the output given (1,0) is 0. The Hebbian rule raises the weight of A and lowers that of B. There are no zero weights, so the capacity of each point on the wave is 1. The counter is incremented to 3. The combinatorics indicates that the apex can store 1 count (2 taken 2 at a time as before), and the other 2 counts can be satisfied on the next lowering of the threshold because 2 taken 1 at a time is 2. In other words, given 2 relevant inputs, a wave value at 1 can be reached if either of the inputs is on (both inputs taken 1 at a time). Lowering the threshold to $-1$, satisfies a count of 1; lowering it again to $-2$ satisfies the total current memory count of $-3$.

Finally, writing (0,0), $A=0$, $B=0$ indicates no differential weighting towards the inputs. All vectors are on, simply translate the count of 4 to some positive bias such as conserving the previously generated negative threshold.

All these transitions followed an output of 0 to the new vector, indicating that the input vector was not represented in memory. These transitions are linear, but if the output to a vector <0, writing it to be the memory implies accounting for an interaction between the current memory of vectors and the new vector. This signals the need to generate a new, higher frequency compartment (equivalent to saying "higher slope" or "smaller period"). Such a case is shown in the right side of FIG. 6, at time 182. Because output<1 is also true when output<0, the Hebbian rule is applied as before to all existing weights (e.g. compartment 113a). This results in the weights of the first compartment both going to zero (and therefore not shown). However, information beyond the ability of the Hebbian rule can still be recovered by forming a new compartment. The weights of this compartment are taken from those weights of the first compartment that were "in error" or were complementary to the new input vector. At time 182, both inputs A and B are complementary to their respective weights A and B, so both weights are included in the new compartment. In other words, to obtain the weights to be stored in a newly created additional compartment, each weight of the existing compartment is converted from a binary value to a bipolar value and the sign of the bipolar value is compared with the sign of the weight. The signed weight of the additional compartment is set to zero if the sign of the bipolar value is the same as that of the signed weight of the existing compartment and equal to the signed weight of the existing compartment if the signs differ. The new period of the compartment is taken as the distance from the old apex to, in essence, the new apex that must also be included in the wave. This apex to apex distance defines the new wave's period, this period is incidentally equal to the sum of the weight magnitudes that were in error, which is also the definition of the new amplitude. Because the period equals the amplitude of these new, higher frequency compartments, the new slope always equals 2. Amplitude and phase are calculated from the weights as always.

However, one final addition must be made to calculate threshold from the counter. For higher frequency waves, lowering the threshold across the wave includes a higher number of points above any given threshold, compared to a lower frequency wave. For instance, the higher frequency wave just created has 2 apexes, and lowering the threshold must account for both of them. In general, the increase in capacity given by lowering the threshold is equal to $2^{(slope-1)}$. Because $2^1=2$, the counter of 2 can be satisfied by lowering the threshold only once from the apex. Because slope=2, the next lowest readable point of the wave is at threshold=$-2$.

Having formed another compartment, there is also a way to destroy a compartment once it is no longer needed. Essentially, the higher frequency compartments represent higher order interaction terms, in this case an XOR interaction between A and B. In general, when an interaction term is in error (in the sense that the neuron's output<1), parts of it may still be correct. For instance, later cases in 3 variables will show a three-way identity interaction of A, B, and C to be formed for the memories of (0,0,0) and (1,1,1). This interaction is in error when given (0,0,1), but its subterms A and B still retain the identity relationship. In general, the simple Hebbian rule is applied to the compartment of slope=1, and a "compound" Hebbian rule is applied to all others. This compound Hebbian rule splits the high order term into 2 subterms, one based on the complement of the new input and weight vectors and the other based on the identity of the input and weight vectors. If either one of these two subterms is left with only 1 input (e.g. less than two non-zero weights), it is destroyed (an interaction must have at least 2 inputs). In other words, after converting binary input values to bipolar values and comparing signs of the input values with the signs of the weights, as before, the magnitude of a signed weight of the original compartment is incremented if the signs are the same and the signed weight is set to zero if the signs are different. The signed weights of the additional compartment are set to a value which is derived by incrementing the magnitude of the original compartment if the signs of the bipolar input values and the signed weights are different and set to zero if they are the same. For 4-way interactions, one or both subterms may survive. For example, given stored inputs (0,0,0,0) and (1,1,1,1), an input vector of (0,0,1,1) will cause both compartments to survive as two identity functions, EVEN (A,B) and EVEN (C,D). However, an input vector of (0,0,0,1) will reduce the identity function to only (A,B,C). For 3-way interactions among N variables, only one compartment will survive. When a 2-way interaction among N variables is in error and therefore split, it can be decomposed only into its first order terms, not a lower order interaction so neither compartment will survive in its split form.

It should be noted that the above description provides for a complete traversal of the states illustrated in FIG. 5. In a similar manner, FIG. 5 can also be traversed by other routes depending upon the order of the combinations of input values applied to the neuron. Therefore, the above discussion has demonstrated that the neuron architecture according to the invention is capable of expression of learning which is Boolean-complete.

It should also be noted that the above traversal of FIG. 5, as illustrated in FIG. 6, occurs for a mapping of each input vector to a desired value of 1. If a mapping to 0 is desired for one or more combinations of inputs a storage of 0 or a decision not to store the vector would be functionally equivalent and the distinction between these two conditions, if desired, would be stored elsewhere, such as in a parallel neuron, as pointed out above. In the case of a mapping to a desired value of 0, the state of the storage in the neuron is not effectively changed and the same representation of the activation function remains unchanged. Therefore, the final learning state of the neuron could be in any one of the state representations of FIGS. 5 or 6.

Figure 7A:
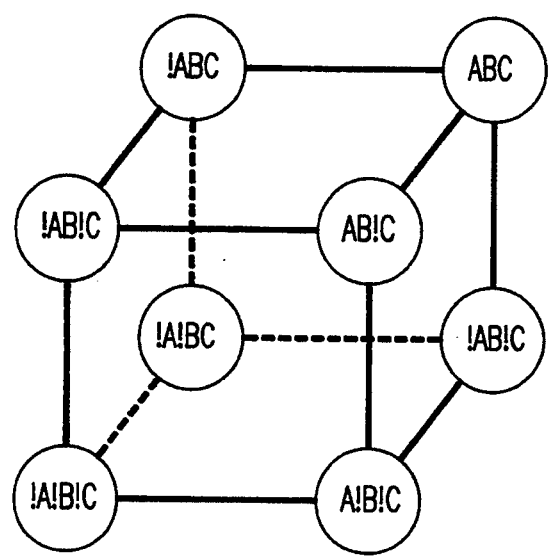
FIGS. 7a and 7b show a modification of the notation shown in FIGS. 4a and 4b for illustrating Boolean states for three inputs.

It should be recognized that some concerns which may exist for application of the above technique to the architecture of the present invention for three or more values of an input vector become trivial when applied to a two-valued input vector and were not included in the above discussion. Additional complexities which have been found for three variables will now be explained with reference to FIGS. 7-10. FIG. 7a is equivalent to FIG. 4a, except that a ball-and-stick figure is used to show the 3 dimensions (N−3) of a cube corresponding to the three input values of a vector. There are 8 possible input vectors, from all inputs off ($|A|B|C$) to all inputs on (ABC).

Figure 7B:
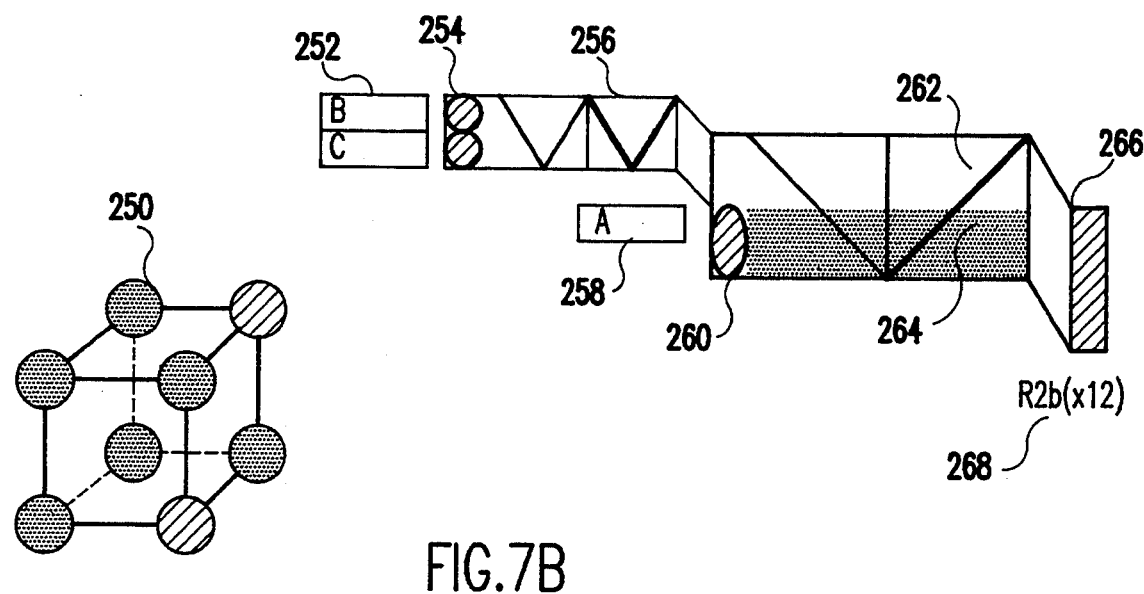

FIG. 7b also introduces a new graphical representation of a multiplex neuron to demonstrate the multiple compartments when N>2. Feature 250 represents the input vectors in memory, in this case (1,0,0) and (1,1,1). This memory is represented by 2 compartments in the neuron depicted. Feature 252 shows that two inputs, B and C, have non-zero weights at feature 254 that inject to the high frequency compartment storing transition function 258. This periodic function of amplitude=2, phase=2, and period=2, represents the identity relationship between the inputs of B and C. This compartment produces an output of 2if B and C are 258 represents the only input to the linear compartment (slope=1), input A, with a weight of +2. These graphical portrayals of the multiplex neuron show the high frequency compartment injecting into the lower frequency compartment, but because the linear compartment implies additivity of its inputs, this nested representation is equivalent to the separate compartments which are then summed by the Adder 120 of FIG. 8. The form of the linear transfer function in either case is linear (slope=1) as in feature 262, and the amplitude and phase are still given by the sum of their connections (whether weights or other waves). Feature 264 shows the threshold=−2 as diagrammed before in FIG. 4b, but notice how only 1 threshold value is required whether there are 1 or many compartments. This linear compartment and the final threshold can be viewed as the main cell body, or soma, of the neuron. The cell body then has an axon extension that terminates in a synapse at feature 266. The synaptic action can be excitatory or inhibitory depending on the type of transmitter in 266. Just as solid and shaded regions are used to distinguish positive and negative weights, this solid termination at 266 indicates an excitatory output. Feature 266 presents the scheme used below and in the Appendix for labeling the various configurations, or equivalence classes. R stands for "representation" followed by the number of vectors in the memory, in this case 2. When there are various configurations that are possible for any given number of memories, the configurations are further distinguished by a letter; given N=3, there are 3 possible configurations of 2 memories—a,b, and c. Finally, the (X12) indicates how many equivalent functions are represented in each equivalence class by rotation. In this case, the cube can be rotated to 12 different Boolean functions, all of which have the same equivalent representation.

Figure 8:
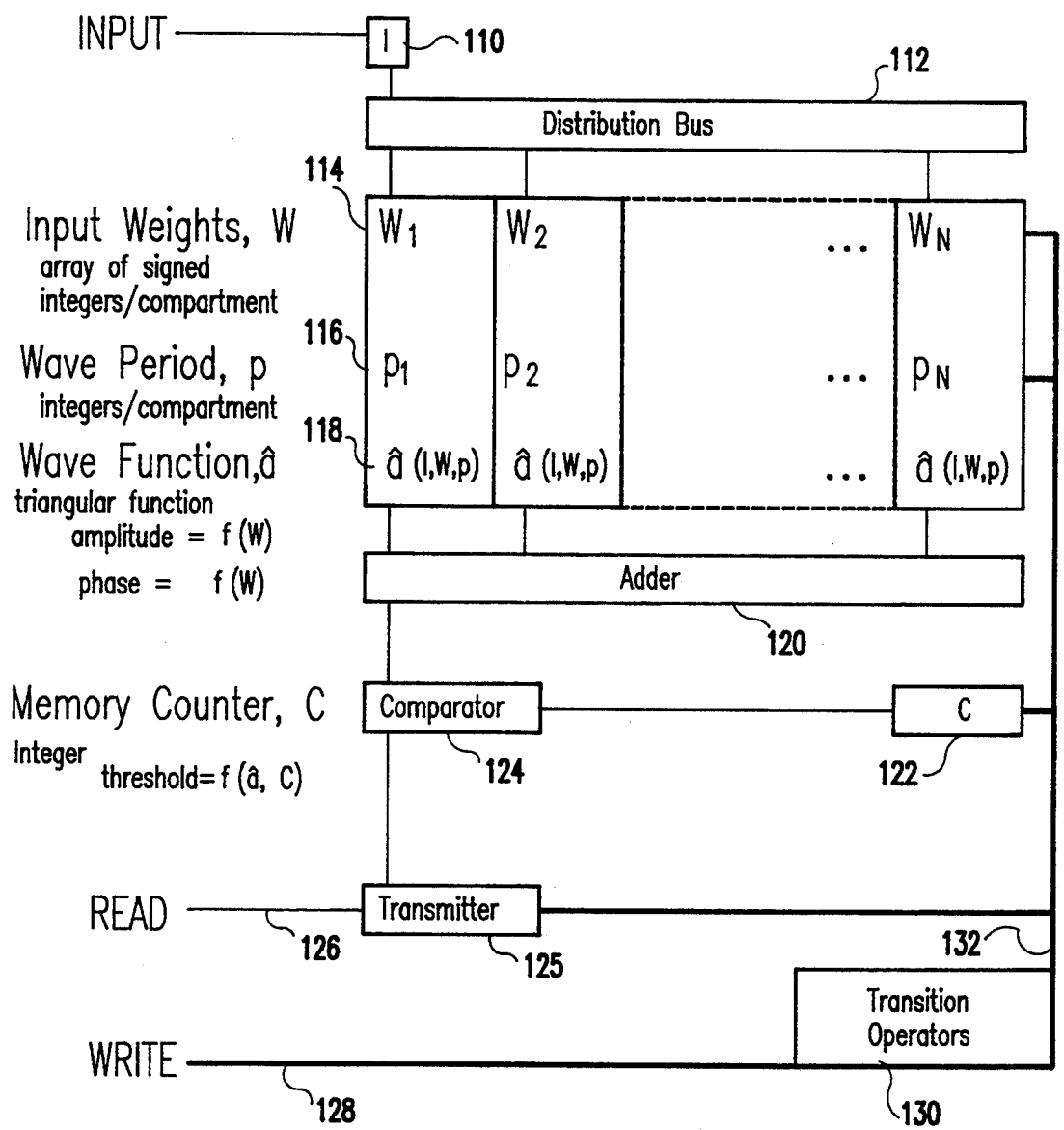
FIG. 8 illustrates a modification of FIG. 3 for generalization of the invention to input vectors of N values.

Because the use of inversion is the preferred implementation for N variables, as will be discussed in greater detail below, FIG. 8 reintroduces FIG. 3 except with the addition of feature 125. This corresponds to the transmitter type in FIG. 7b, which can be excitatory or inhibitory. If the transmitter is excitatory, the memory in FIG. 8 stores all cases ever written, and when presented with one of these cases, the output is positive. However with this invention, when the number of cases seen fills more than half the space, the transmitter becomes inhibitory and the neuron stores all the cases it has not seen. When presented with one of these unseen cases, the signal up to feature 124 is positive and the transmitter than inverts it to an inhibitory output. When the memory is more than half filled with cases that are "on", the response bias is taken to be "on" unless the neuron signals an inhibition to turn it "off."

The complete set of representations for N=3 is given in the appendix to this specification, demonstrating this invention and the use of the given transition operators for more than 2 inputs. There are 256 functions represented by 22 equivalence classes, from R0 to R8.

Figure 9:
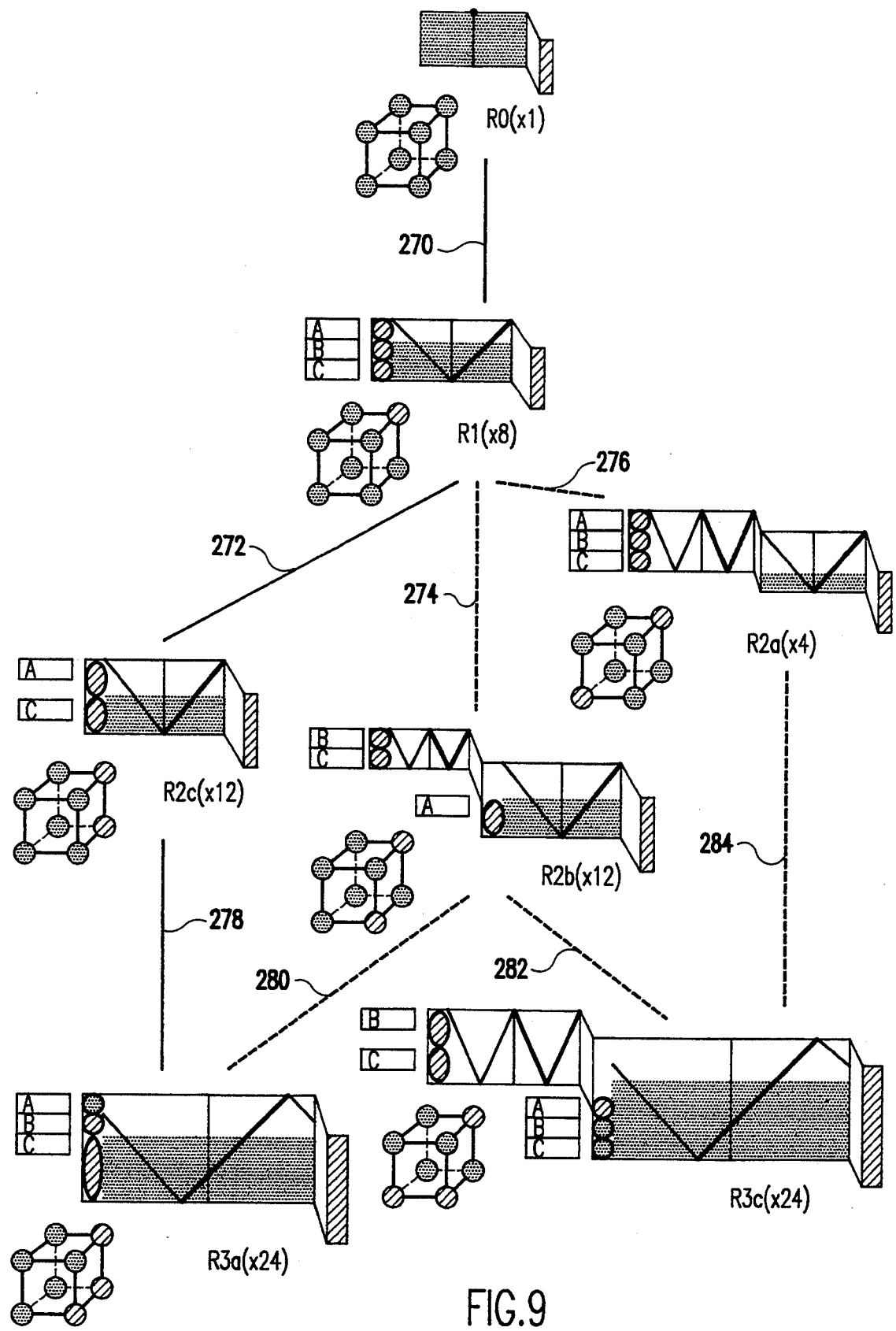
FIG. 9 illustrates the first few transition operations of the present invention for three inputs.

A subset of the transitions between these representations is shown in FIG. 9. Again starting at Never for 3 variables, there is only 1 representation for writing any 1 of the 8 corners of the cube to "on". The simple Hebbian rule suffices to change the weights of the linear compartment toward the input vector as shown at time 270. The threshold lowers to allow 1 point, equivalent to the point on the transfer function when all 3 inputs are on (3 taken 3 at a time).

Time 272 shows a subsequent simple Hebbian weight change when writing (1,0,1). The output of this vector in R1 is 0, so a Hebbian change of weights produces R2c. At the other extreme, an input of (0,0,0) to R1 produces an output at the nadir of the wave in R1 (and below the threshold), indicating that a higher frequency compartment (an interaction term) must be generated. The Hebbian rule to the first compartment shows that its weights all return to 0, but the new compartment assumes all 3 inputs because all three inputs were complementary to the previous weights. R2a stores both (1,1,1) and (0,0,0) as a 3-way identity function. The period=3 (slope=2) is the Hamming distance between these vectors in memory.

Time 274 shows an intermediate case, where the transition is neither totally linear nor totally interactive. When (1,0,0) is written to R1, the output is less than 1 because the vector has not been written before, and the Hebbian rule changes the weights of the linear compartment to that in R2b. The weight of A becomes larger, while those of B and C return to 0. The output of (1,0,0) in R1 is less than 0, so a new compartment is also created. The sign of A is identical to its weight in R1, so only B and C are in error and only the weights of B and C are taken as the new weights on the new compartment. Again, slope=2, and from this, period can be calculated as 2; the Hamming distance between these 2 memories=2. However, this interaction term between B and C is only within the context of A being "on". Therefore, it is the conjunction (addition) of these 2 compartments that exactly specifies the perfect memory. One compartment represents IfA, while the other represents Even (B,C). Together they specify the exact map for the 2 cases in memory.

Time 278 shows the continuing linear transition from R2c to R3a. Time 280 shows that the same canonical form is reached when (1,0,1) is written to R2b. The Hebbian rule in the linear compartment moves the weights of A from 2 to 3, B from 0 to −1, and C from 0 to 1. The two-way interaction of the second compartment is split and eliminated.

Another canonical form is shown in the transitions from R2a and R2b into R3c. When (1,0,0) is written to R2a, simple Hebbian weight changes to the first compartment are correct, and the 3-way identity function is reduced to the 2-way identity function across only B and C. Of the 3 vectors now in memory (0,0,0), (1,1,1), and (1,0,0), an identity remains for only B and C. This Even (B,C) compartment in R3c would also have the vector (0,1,1) turn the neuron "on". But the context of the linear compartment is centered around (1,0,0) given the weight vector (+1, −1, −1), and so, this context around (1,0,0) eliminates the spurious memory. Again, the addition of outputs from both compartments serves to form a conjunction that exactly specifies the perfect memory.

Time 282 leads to the same representation. This time, the B and C inputs of the higher frequency compartment are not split apart but simply become stronger. The Hebbian rule on the linear compartment changes the weights to the same linear context as before.

The following implementations are preferred as helpful in extending the above discussion to the general case.

1. Threshold. When calculating threshold across multiple compartments, the capacity of each wave must be considered separately beginning with the highest frequency compartment. Threshold is lowered according to its capacity until the count of memories is satisfied. If its full capacity is reached without yet satisfying the count, threshold is lowered across its full extent (its amplitude) accounting for as much as it can, and the residual count is left for the next lower frequency compartment to satisfy by further lowering the threshold, and so on.

2. Inversion. A form of DeMorgan's Law from logic is found by inverting the weights, wave function, count, and transmitter of the neuron. This gives an equivalent function between remembering the cases which are in memory, or instead, remembering the cases which are not in memory. The transition functions are simplified by counting and remembering the lesser of the two. For instance, the counter keeps a number of the input vectors that have been put into the memory, but as soon as this number is more than half the possible input vectors, it is more efficient to count and store the vectors that have not been written. DeMorgan's Law states that |A AND |B is equivalent to |(A OR B). In the neuronal representation of |A and |B, we view this as a memory for the vector (0,0), represented by the weights (−1,−1), a counter of 1, and an output signal that is excitatory. When given the input vector (0,0), the neuron signal with a positive output. However, by inverting the weights to (1,1), setting the counter to 3, and making the neuron's output inhibitory, the neuron will signal inhibition EXCEPT when given the input vector (0,0). Notice that the counter now stores the number of input vectors not seen, but otherwise, the two forms are informationally equivalent. However, the inverted form is simpler whenever the number of vectors not seen is less than the number seen. In general, the count-seen equals $2^N=(2N-\text{count-not seen})$, the signal type is simply inverted, and the weight set is inverted to the set of values that will shift the phase by half the period (to invert the wave). For the case of |A AND |B, period=4, so the weight set is changed by a total amount of 2 (from −1, −1 to 1,1). Finally, if the representation has been inverted so that the output sign is inhibitory (the memory is for cases not seen), writing a new case causes the erasing of the input vector, rather than the writing. Erasing is merely the complement of writing; for instance, the Hebbian weight change is $-(2I+1)$ rather than $+(2I+1)$, and the counter is decremented rather than incremented. Other non-inverted transition rules are possible within the general spirit of this invention, but the equivalence by inversion allows a simpler set of transition operators and is so preferred. The Appendix to this specification shows the transitions similar to those previously shown in FIG. 6, but with this invention and subsequent transition style whenever the number of vectors written is more than half of those possible.

Figure 10:
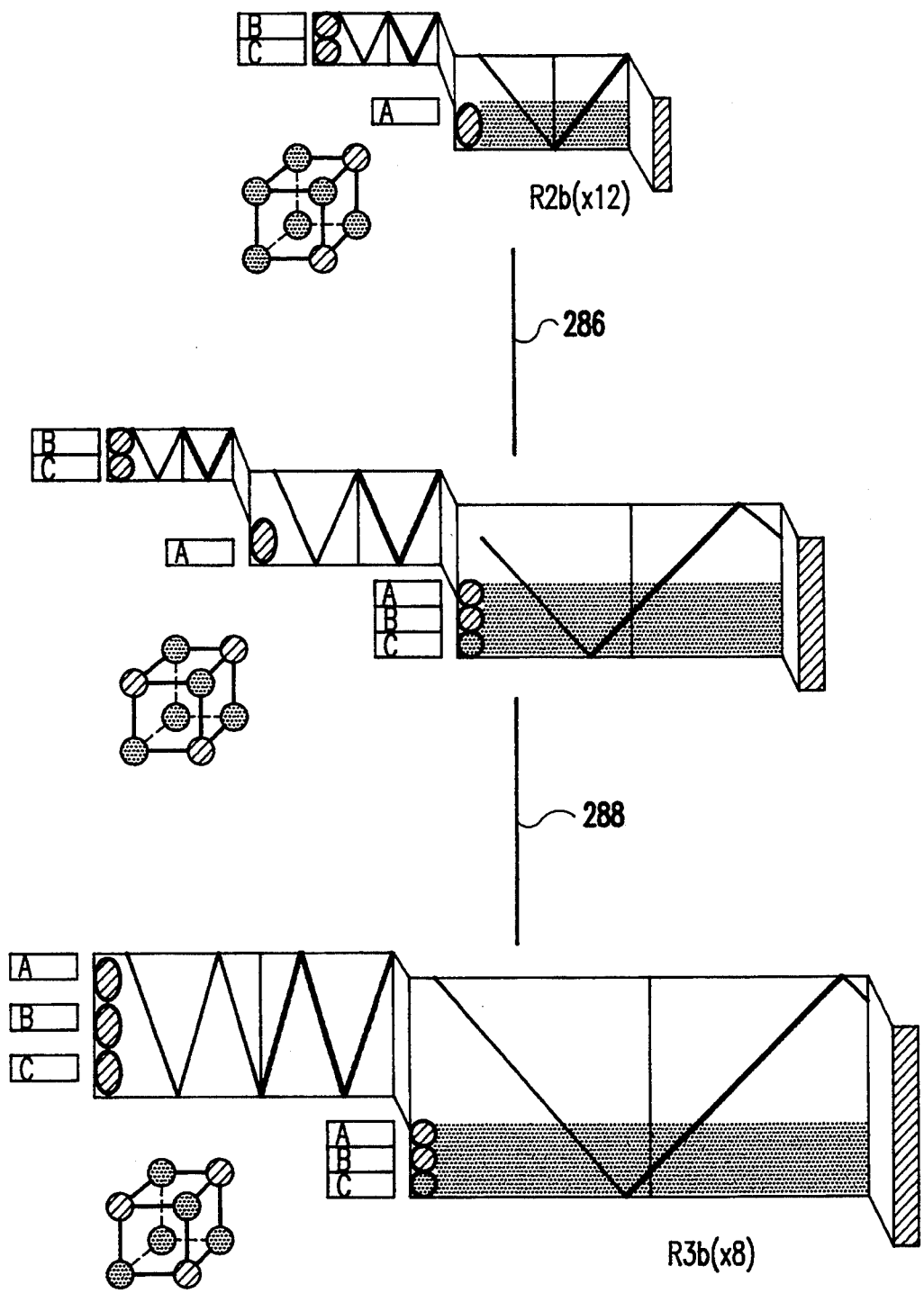
FIG. 10 is illustrative of a nesting operation involved in generalizing the invention to an input vector of N values.

3. Intermediate or Temporary Nesting. The new higher frequency terms indicated whenever writing a new vector that produces an output <0, is constructed not only from the set of first order terms that are error (from the simple inputs to the first compartment), but also from any other waves that are in error. This happens only one time in the representative transitions for 3 variables. There are various ways to account for these additional terms in creating the weights of the new wave, but a preferred way is to temporarily create a nesting of one wave injecting another. Such configurations are functionally correct, but by subsequent combination of these two waves, a single wave can replace them as an un-nested structure. In FIG. 10 showing representations for 3 variables, this occurs in transition from R2b to R3b. Given a new vector such as (0,0,1), the A input is in error as well as the identity wave between B and C. Both forms, one first order weight and one second order wave, are used to form the inputs to the new wave. This configuration is shown after the transition at time 286 in the uppermost representation of FIG. 10. The EVEN2(B,C) wave ("EVEN2" means even parity in base 2; ConExNS can represent parity in any base, the base being related to the period of the wave) and the A input can both inject into a new wave of period 4, a nested form created by following the above described transitions. For simplicity, however, this nested form is converted into its equivalent form of EVEN2(A,B,C) as shown at time 288 in the middle representation of FIG. 10. In a fuzzy set notation, this is equivalent to converting EVEN2 [EVEN2 (B,C)A] into EVEN2 (A,B,C). Other non-nested means are also possible such as directly accounting for the collective error of the first order terms; in this example, A, B, and C are all in error as propagated through their respective waves, so all are included on the new higher frequency wave.

Therefore, it is seen that the present invention provides an emulation of a biological neuron which is physically realizable in electronic circuitry, providing a compressed representation of stored vectors in Boolean space, immediately incorporates newly stored data into the response provided, independent of the number of vectors previously stored and provides an artificial neuron having the capacity for influence and the determination of confidence levels for any response. Additionally, any Boolean state may be reached by a plurality of paths and yet always arrives at a single canonical representation for that state.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of adaptively altering a state of an artificial neuron, said neuron storing data in at least one compartment representing at least a domain of a periodic function, including the steps of
   producing an output of said artificial neuron in response to an input vector, and
   generating an additional compartment for further storage of data representing at least a domain of another periodic function in response to an output of said artificial neuron less than zero.

2. A method of adaptively altering a state of an artificial neuron, as recited in claim 1, including the further steps of
   storing a weight vector in said additional compartment, and
   eliminating said additional compartment when said at least one compartment contains a weight vector specifying less than two non-zero weights.

3. A method of adaptively altering a state of an artificial neuron, as recited in claim 2, wherein said input vector includes binary values, including the further steps of
   converting each binary value in said input vector to a bipolar value,
   comparing a sign of each said bipolar value to a signed weight corresponding to each said bipolar value,
   setting each said signed weight value by incrementing a magnitude of said signed weight value if said sign of said bipolar value is the same as that of said signed weight value and setting said signed weight value to zero if sign of said bipolar value is different from that of said signed weight value, and setting each signed weight value of said additional compartment by incrementing said magnitude of said signed weight value and setting the signed weight value of said additional compartment to that value if said sign of said bipolar value is different from that of said signed weight value and setting said signed weight value of said additional compartment to zero if said sign of said bipolar value is the same as that of said signed weight value.

4. A method of adaptively altering a state of an artificial neuron, as recited in claim 1, wherein said input vector includes binary values, including the further steps of converting each binary value in said input vector to a bipolar value, comparing a sign of each said bipolar value to a signed weight corresponding to each said bipolar value, and setting each signed weight value of said additional compartment to zero if said sign of said bipolar value is the same as that of said signed weight value and equal to said signed weight value if said sign of said bipolar value is different from that of said signed weight value.

5. An architecture for an artificial neuron capable of providing an output corresponding to an input vector including at least one compartment means for at least storing data representing at least a domain of a periodic function representing an output in response to an input vector, and means for generating an additional compartment means for storing data representing at least a domain of another periodic function in response to a predetermined output of said at least one compartment for a particular input vector.

6. An architecture for an artificial neuron as recited in claim 5, wherein said data includes at least wave period data.

* * * * *